United States Patent
Melcher et al.

(10) Patent No.: US 9,302,623 B2
(45) Date of Patent: Apr. 5, 2016

(54) APPARATUS FOR MOUNTING AN OBJECT TO A STRUCTURE IN A VIBRATION-FREE MANNER

(71) Applicant: Deutsches Zentrum fur Luft- und Raumfahrt e.V., Cologne (DE)

(72) Inventors: Joerg Melcher, Lehre (DE); Bjoern Timo Kletz, Braunschweig (DE); Julian Redlich, Braunschweig (DE)

(73) Assignee: DEUTSCHES ZENTRUM FUR LUFT-UND RAUMFAHRT E.V., Cologne (DE)

(*) Notice: Subject to any disclaimer, the term of this patent is extended or adjusted under 35 U.S.C. 154(b) by 123 days.

(21) Appl. No.: 13/964,251

(22) Filed: Aug. 12, 2013

(65) Prior Publication Data

US 2013/0328337 A1   Dec. 12, 2013

Related U.S. Application Data

(63) Continuation-in-part of application No. PCT/EP2012/052283, filed on Feb. 10, 2012.

(30) Foreign Application Priority Data

Feb. 11, 2011 (DE) .......................... 10 2011 000 656
Mar. 21, 2011 (DE) .......................... 20 2011 000 635

(51) Int. Cl.
*F16F 1/34* (2006.01)
*B60R 1/076* (2006.01)
*F16F 7/104* (2006.01)
(Continued)

(52) U.S. Cl.
CPC ............ *B60R 1/076* (2013.01); *F16F 7/104* (2013.01); *F16F 15/022* (2013.01); *F16M 13/02* (2013.01)

(58) Field of Classification Search
USPC .................................................. 267/159–165
See application file for complete search history.

(56) References Cited

U.S. PATENT DOCUMENTS 2,407,757 A * 9/1946 MacCallum ............... 192/84.94
3,519,335 A * 7/1970 Russell .......................... 359/843
5,140,733 A * 8/1992 Shimada et al. ............. 29/896.9
(Continued)

FOREIGN PATENT DOCUMENTS

DE   92 01 007 U1   6/1992
DE   42 00 744 C2   4/1995
(Continued)

OTHER PUBLICATIONS

PCT International Preliminary Report in co-pending, related PCT Application No. PCT/EP2012/052283 mailed Aug. 13, 2013.

*Primary Examiner* — Christopher Schwartz
(74) *Attorney, Agent, or Firm* — Thomas | Horstemeyer, LLP

(57) ABSTRACT

The invention relates to a device for mounting an object to a structure in a vibration-free manner. The device has an elastic arrangement that supports the object at the structure in a stiff manner in the directions of at least two of the total of six translational and rotational degrees of freedom and in a soft manner in the directions of at least one of the total of six translational and rotational degrees of freedom. Main modes of motion of the object in the directions of the rigid support have natural frequencies that are higher than any main mode of motion of the object in any direction of the soft support at least by a factor of ten. The soft support is undamped, and a damping device is provided for any main mode of motion of the object in any direction of the soft support.

13 Claims, 13 Drawing Sheets

(51) Int. Cl.
 *F16F 15/02* (2006.01)
 *F16M 13/02* (2006.01)

(56) References Cited

U.S. PATENT DOCUMENTS

| | | | |
|---|---|---|---|
| 5,492,313 A | | 2/1996 | Pan et al. |
| 5,709,516 A | * | 1/1998 | Peterson et al. ............... 411/544 |
| 2004/0021123 A1 | * | 2/2004 | Howell et al. .................. 251/337 |

FOREIGN PATENT DOCUMENTS

| | | |
|---|---|---|
| DE | 195 37 462 A1 | 4/1997 |
| DE | 197 23 515 A1 | 12/1998 |
| DE | 198 03 459 A1 | 9/1999 |
| DE | 100 26 119 A1 | 5/2001 |
| DE | 100 26 169 C2 | 6/2003 |
| DE | 100 26 178 C2 | 10/2003 |
| DE | 101 43 976 B4 | 12/2005 |
| DE | 10 2006 056 757 A1 | 6/2008 |
| EP | 1 927 782 A1 | 11/2007 |
| JP | 59 106740 U | 7/1984 |
| JP | 63 156848 U | 10/1988 |
| JP | 2003 081015 A | 3/2003 |
| JP | 2007 255147 A | 10/2007 |
| WO | 91/02921 A1 | 3/1991 |
| WO | 01/81785 A1 | 11/2001 |
| WO | 2006/024426 A2 | 3/2006 |

* cited by examiner

APPARATUS FOR MOUNTING AN OBJECT TO A STRUCTURE IN A VIBRATION-FREE MANNER

CROSS REFERENCE

This present invention is a continuation-in-part (CIP) of International Patent Application PCT/EP2012/052283 entitled "Mounting an Object on a Structure in a Vibration-Free Manner" with an International Filing Date of Feb. 10, 2012 and claiming priority to German Patent Applications DE 10 2011 000 656.7, filed on Feb. 11, 2011, and German Utility Model Application DE 20 2011 000 635.2, filed on Mar. 21, 2011, both entitled "Schwingungsfreie Lagerung eines Objekts an einer Struktur".

FIELD OF THE INVENTION

The present invention relates to an apparatus for mounting an object to a structure in a vibration-free manner, the apparatus comprising an elastic arrangement supporting the object at the structure.

The present invention particularly relates to an apparatus for mounting an object to a structure in such a way that the object—despite being mounted in a vibration-free manner in one or more directions—follows movements of the structure in other directions. This means that the object is rigidly guided by the structure in these other directions. Typically, no vibrations occur in these other directions so that there is no need of avoiding a transfer of these vibrations between the object and the structure in these other directions.

BACKGROUND ART

It is known for various currently produced motor vehicles, particularly minibuses and trucks, that vibrations of the mirror glass of an exterior rear view mirror of these motor vehicles may occur in a frequency range of 10 to 80 Hz and at a considerable amplitude which has to be considered as being critical.

It is further known that mirror glasses of exterior rear view mirrors of motorbikes intensively vibrate in specific motor rotation speed ranges to such an extent that the exterior rear view mirrors lose their function and the driver of the motorbike has to turn around for viewing backwards.

Besides approaches to stiffen the support of the mirror glass of the respective exterior rear view mirror at the body of the motor vehicle such that relative vibrations of the mirror glass with regard to the body do no longer occur, it is also known to attenuate occurring vibrations of the mirror glass of the exterior rear view mirror by means of a friction damper (see for example DE 101 43 976 B4 or DE 198 03 459 A1) or by means of a vibration absorber (see for example DE 42 00 744 C2). Whereas the efficiency of friction dampers strongly depends on the weather, particularly on atmospheric moisture and temperature, friction dampers often do not achieve a sufficient lifetime, and friction dampers also transfer disturbing forces from the body onto the mirror glass of the exterior rear view mirror, vibration absorbers are only effective in a small range of frequencies around their absorber eigenfrequency.

Active measures for suppressing vibrations are also known. They use activatable functional materials to apply forces to a mounted object to keep the object at rest by means of adjusting a sum total of the forces acting on the object to zero. Such an active vibration suppression does also not have a very large range of efficiency. Here, however, rather a limitation with regard to the coverable amplitudes is given than with regard to the coverable frequencies. This particularly applies, if, due to interposed adjusting and retracting mechanism for example, a mirror glass of an exterior rear view mirror can not be essentially rigidly mounted to the body of a motor vehicle.

U.S. Pat. No. 5,492,313 discloses flexure bearings for reciprocating components of cryo coolers. These bearings were first applied with spiral-cut diaphragms. According to U.S. Pat. No. 5,492,313 A, such flexure bearings for reciprocating machines comprising a translating cut diaphragm with circumferential tangent cantilever flexure blades secured between rim and hub spaces are improved by symmetrical opposing end angles and ends equally displaced from radial lines extending from the center of the diaphragm.

DE 197 23 515 A1 comprises an elastic element with leaf springs for a connection of two parts which is elastic in one direction of motion. A plurality of such elastic elements which are arranged at a distance in this direction of motion can be used for mounting an object to a structure such that the object is softly supported at the structure in this direction of motion whereas it is rigidly guided by the structure in all other directions.

There still is a need of an apparatus for mounting an object to a structure in a vibration-free manner, which has general advantages, like for example in mounting an object subjected to aerodynamic loads to the body of a motor vehicle.

SUMMARY OF THE INVENTION

The present invention relates to an apparatus for mounting an object to a structure in a vibration-free manner. The apparatus comprises an elastic arrangement configured to provide a stiff support for the object at the structure in the directions of at least two of a total of six translational and rotational degrees of freedom, and a soft support for the object at the structure at least in the directions of one translational degree of freedom. Each main mode of motion of the object in any direction of the stiff support comprises an eigenfrequency which is by a factor of at least ten higher than any eigenfrequency of any main mode of motion of the object in any direction of the soft support; and the elastic arrangement is undamped in each direction of the soft support. The apparatus further comprises an attenuation device for any main mode of motion of the object in any direction of the soft support.

The present invention further relates to an apparatus for mounting an object to a structure, the apparatus comprising an elastic arrangement including at least two elastic partial arrangements arranged at a distance in the direction of a main axis. The elastic partial arrangements are soft in the direction of the main axis and stiff in all directions orthogonal to the main axis. Each elastic partial arrangement comprises an inner connection area close to the main axis and an outer connection area farther away from the axis; and each elastic partial arrangement comprises at least two leaf springs which extend between the inner connection area and the outer connection area and which are spirally wound into each other within a common leaf plane.

Other features and advantages of the present invention will become apparent to one with skill in the art upon examination of the following drawings and the detailed description. It is intended that all such additional features and advantages be included herein within the scope of the present invention, as defined by the claims.

BRIEF DESCRIPTION OF THE DRAWINGS

The invention can be better understood with reference to the following drawings. The components in the drawings are not necessarily to scale, emphasis instead being placed upon clearly illustrating the principles of the present invention. In the drawings, like reference numerals designate corresponding parts throughout the several views.

DETAILED DESCRIPTION

Figure 1:
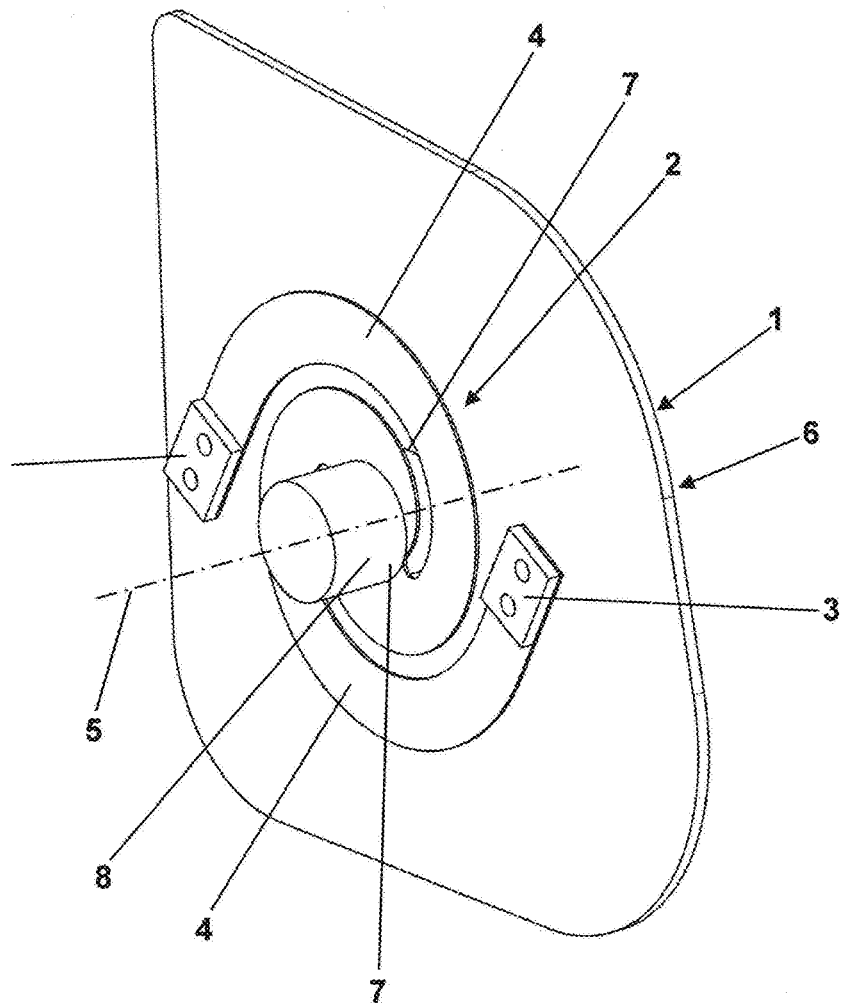
FIG. 1 is a perspective rear view of a mirror glass of an exterior rear view mirror for a motor vehicle showing essential parts of an apparatus for mounting the mirror glass to a body of a motor vehicle not depicted here.

With regard to mounting an object to a structure, the term "in a vibration-free manner" here both relates to avoiding the transfer of vibrations from the structure to the object or vice versa and to counter-acting any undesired vibrations of the object.

With regard to avoiding the transfer of vibrations from the structure to the object, the present invention for example relates to mounting a mirror glass of an exterior rear view mirror of a motor vehicle to the body of the motor vehicle. This particular application of the present invention, however, should only be taken as an example. It is not intended as a limitation to the present invention.

A mount for the mirror glass of an exterior rear view mirror of a motor vehicle is a typical example of a system in which both a root point excitation coming from the supporting structure and an excitation by external forces, here particularly by aerodynamic loads, may take place. If these excitations result in vibrations of the mirror glass of the exterior rear view mirror, the mirror image visible in the mirror glass is shaking of blurred. This causes considerably safety risks in road traffic.

Other possible applications of the present invention with regard to avoiding the transfer of vibrations from the structure to the object include mounting sensors or handles to hammering or shaking appliances like, for example, jackhammers.

Other possible applications of the present invention with regard to avoiding the transfer of vibrations from the object to the structure include mounting hammering or shaking appliances as well as any motors to fixed or mobile structures and mounting the stators of rotary bearings of rotors of wind power plants to their pylons.

The apparatus for mounting an object to a structure in a vibration-free manner according to the present invention comprises an elastic arrangement which supports the object at the structure in a stiff manner in the directions of at least two of the total of six translational and rotational degrees of freedom, and in a stiff manner in the directions of at least one, often at least two of the total of six translational and rotational degrees of freedom. The main modes of motion of the object in the directions of the hard or stiff support comprise an eigenfrequency which is higher than the eigenfrequencies of the main modes of motion of the object in the directions of the soft support at least by a factor of ten; and the soft support as such is not damped, i.e. it is undamped. Instead, an attenuation device is provided for vibrations of the object in those directions in which the object is supported at the structure in a soft manner, i.e. in a soft elastic way.

The elastic arrangement of the apparatus of the present invention clearly distinguishes between degrees of freedom in which the object is softly supported at the structure, and degrees of freedom in which the object is supported at the structure in a hard or stiff manner. Looking at the total of six translational and rotational degrees of freedom consisting of three translational degrees of freedom, i.e. linear movements in the three directions of space, and three rotational degrees of freedom, i.e. rotational movements about the three directions of space, the soft support and the stiff support may both be given in the directions of at least two degrees of freedom.

Typically, the directions of the soft support include those of one translational degree of freedom and two rotational degrees of freedom about the two axes which are orthogonal to the direction of the translational degree of freedom; whereas the stiff support is present in the direction of the remaining two translational and one rotational degrees of freedom.

The soft support has the function of elastically decoupling the object from the structure in the directions of the respective degree of freedom. Correspondingly, this soft support is selectively to be provided in those directions in which the object may be excited for vibrations by the vibrating structure or vice versa. The decoupling provided by the soft support results in a vibration isolation of the object from the structure in these directions. It is clear that this only applies to frequencies above the eigenfrequency of the main modes of motion of the object in the directions of the soft support. These eigenfrequencies of the object in the directions of the soft support may, however, be set so low by purpose that they are below the frequencies at which the structure vibrates.

Additionally, the attenuation device is provided for the main modes of motion of the object in the directions of the soft support, and compensates for any excitations in the area of low frequencies which are transferred from the structure to the object.

Whereas the directions of the soft support are those directions in which the vibrations of the structure are to be isolated from the object, the directions of the hard or stiff support are those in which the object should follow the structure in case of any movement of the structure and/or in which the object should be rigidly supported at the structure with regard to external forces.

It is particularly preferred in the apparatus according to the present invention that the main modes of motion of the object in the directions of the soft support are decoupled from each other. This means that a displacement of the object in the direction of one degree of freedom does not automatically result in a displacement in the direction of any other degree of freedom. An even farther reaching separation is achieved by eigenfrequencies of the different main modes of motion separated from each other by a clear distance in the frequency space. This decoupling inhibits that a mutual excitation of the main modes of motion of the object takes place. This makes it easier to dampen the main modes of motion of the object in the directions of the soft support by means of the attenuation device. Particularly, with separated eigenfrequencies of the different main modes of motion, it is sufficient that the absorber device—with regard to the frequency space—attenuates movements of the object in a narrow band around these eigenfrequencies.

Such a narrow band attenuation may, for example, be achieved by a damped passive vibration absorber which has an absorber eigenfrequency adjusted to the eigenfrequencies of the main modes of motion of the object in the directions of the soft support. Such a vibration absorber may have one or a plurality of absorber masses elastically coupled to the object. Due to the damping of the vibration absorber, it does not only comprise an absorber efficiency exactly at its absorber eigenfrequency but also in a frequency band extending around its absorber eigenfrequency. Ideally, the absorber eigenfrequencies of the vibration absorber are adjusted to a value which is a little bit lower, like for example by 5% to 25%, than the eigenfrequency of the main modes of motion of the object in the directions of the soft support. In this way the frequency band with absorber efficiency is optimally adjusted to the main modes of motion.

The attenuation factor of the damped vibration absorber determined according to Lehr is preferably smaller than about 0.5. Often it is smaller than 0.4 or even lower.

The vibration absorber of the apparatus according to the present invention may comprise a single absorber mass for attenuating the object in all directions of its soft support, if the absorber mass is coupled to the object via a further elastic arrangement which is equivalent to the elastic arrangement via which the object is mounted to the structure. This equivalence particularly relates to the degrees of freedom in which the absorber mass is supported at the object in a stiff way and in a soft way, respectively. It does not relate to the damping of the support.

The absorber mass or absorber masses of the vibration absorber may also be used for at least partially counter-balancing the object with regard to its connection to the elastic arrangement. This includes a dynamic counter-balance with regard to common movements of the object and the structures in the directions of the hard support.

With regard to the particular application example of an exterior rear view mirror whose mirror glass is to be supported at the body of a motor vehicle or with regard to other cases in which a vibration of the object in a typical range of some 10 Hz is to be suppressed, the main modes of motion of the object in the directions of the soft support may, for example, have eigenfrequencies of not more or even less than about 10 Hz, and the main modes of motion of the object in the directions of the hard support may, for example, have eigenfrequencies of not less or even more than about 100 Hz.

The function of the apparatus according to the present invention also relies on a certain weight of the mounted object, particularly if the attenuation device comprises an vibration absorber with one or more absorber masses elastically coupled to the object. A typical minimum weight of the object is at least about 100 g. Preferably it is about 200 g or even higher. In principle, there is no upper limit for the weight of the object. The apparatus according to the present invention may also be used for mounting very heavyweight objects to a structure, up to a weight of some tons.

In the following, particular embodiments of the elastic arrangement between the object and the structure will be explained.

One of these embodiments comprises two spring elements which are fixed to one or both of the structure and the object in fixing areas which are opposing each other across a center of weight of the object. These two spring elements may, for example, be double springs with two or more bending beams supported at each other via stringers.

It is particularly preferred that the spring elements are leaf springs which are spirally wound within each other in a common leaf plane. Such leaf spring arrangements are very stiff with regard to the translational degrees of freedom with directions in the leaf plane and the rotational degree of freedom about the direction orthogonal to the leaf plane. With regard to the three other degrees of freedom, the support provided by the leaf springs, however, is very soft. By using at least two leaf springs wound within each other, a decoupling of the directions of the soft support of the object is achieved in that a displacement of the object in the one direction of the soft support does not automatically result in a displacement of the object in any other direction of the soft support.

Such a decoupling is also achieved with an elastic arrangement which has two multiple helices of opposite pitches which are connected in series between the structure and the object. Such multiple helices are generally known as construction elements, see DE 100 26 169 C2, DE 100 26 178 C2 and DE 100 26 119 A1, but not in a series connection with opposite pitches.

A further embodiment of the elastic arrangement of the apparatus of the present invention comprises elastomeric springs which are connected to a rigid inner circumference and to a rigid outer circumference of the object and the structure, respectively, and which are distributed over the two circumferences. These elastomeric springs should be soft with regard to tensile load, i.e. have a low tensile stiffness, and they may be subjected to a pressure prestress between the two circumferences.

The elastic arrangement of the apparatus according to the present invention may not only comprise one but even more parallel connected discrete partial elastic arrangements to, for example, limit the building size of each partial arrangement in case of a big and heavy object to be mounted.

Besides passive elements, the elastic arrangement may also include activatable functional materials. These activatable functional materials may be part of the attenuation device. For example, they may be part of a passive absorber device in which the functional materials are components of a mechanical-electrical resonant circuit, or of an active attenuation device in which the functional materials are activated for an active attenuation of movements of the object in the directions of the soft support. In the latter case, the functional materials are for example used to generate forces onto the object which keep it in rest, or they compensate for relative movements between the object and the structure in the sense of an infinitely soft spring to avoid the transfer of forces between the object and the structure. Preferably, the functional materials are arranged in such a way that they generate movements and/or forces between the object and the structure in the directions of the soft support when they are activated. The functional materials may also be integrated into a further elastic arrangement which couples an absorber mass of a passive vibration absorber to the object to actively move the absorber mass of the vibration absorber. However, in case of an active attenuation device, an additional absorber mass is not needed. Thus, the functional materials are preferably integrated into the elastic arrangement in such a way that a passive vibration absorbers for the object is not necessary to dampen the main modes of motion of the object in the directions of its soft support. For this purpose, the functional materials may, for example, be laminated to spiral-shaped leaf springs of the elastic arrangement.

As already indicated, one possible application of the apparatus according to the present invention is mounting the mirror glass, i.e. the reflecting plate, of an exterior rear view mirror to the body of a motor vehicle. Here, the directions of the soft support are particularly those of one translational degree of freedom parallel to the vehicle longitudinal axis and of two rotational degrees of freedom about the vehicle cross axis and the vehicle vertical axis. An exact match of the directions of the soft support with said axes, however, is not important.

In an exterior rear view mirror including the apparatus according to the present invention supports the mirror glass at a mirror holder, i.e. at an interface of the exterior rear view mirror facing the mirror glass.

The mirror holder is typically at least partially enclosed by a mirror housing, and swivel-mounted to the mirror housing via an positioning device. This positioning device is thus located at that side of the apparatus according to the present invention facing away from the mirror glass and extending towards the body of the motor vehicle. Here, a folding hinge may also be provided about which the entire mirror housing can be folded-in with regard to the body of the motor vehicle.

Preferably, the mirror glass of the exterior rear view mirror is inwardly offset with regard to at least one of a rim of the mirror holder and a rim of the mirror housing. The mirror glass is thus protected by the mirror housing or the mirror holder not only with regard to direct aerodynamic loads but also with regard to vortices which are formed at the rim of the mirror housing or the mirror holder as they do not hit the inwardly offset mirror glass. Only pressure fluctuations resulting from these vortices may result in root point excitations of the mirror glass. With regard to such root point excitations, however, the mirror glass is supported via the apparatus according to the present invention in an ideal manner, i.e. in an ideally decoupled and attenuated way.

In another application, the apparatus according to the present invention is part of a wind power plant and is here used for mounting a rotation bearing of a rotor rotating about a rotor axis at a pylon of the wind power plant in a vibration-free manner. In this application, it is a particular goal to avoid that the aerodynamic excitations of the rotor cause any damages. Such damages may not only occur in the area of the rotation bearing or the entire nacelle at the free end of the pylon but also in the area of the foundation of the pylon or the pylon itself. The rotation bearing for the rotor rotating about the rotor axis often includes a gear box increasing the rotational speed of the rotor and sometimes even a generator driven by the rotor if their stators are fixed to the stator or even make up the stator of the rotational bearing of the rotor. In case of a wind power plant, the directions of the soft support by the elastic arrangement of the apparatus according to the present invention are preferably those of a translational degree of freedom in the direction of the rotor axis and of two rotational degrees of freedom about the vertical axis and the horizontal axis running orthogonal thereto.

A further application of the apparatus according to the present invention is a motor bearing for mounting a motor comprising a rotor rotating about a rotation axis to a fixed or moving structure in a vibration-free manner. The motor may, for example, be the motor of a motor vehicle or a stationary motor. In any case, it has to be avoided that the motor excites the structure for vibrations. For this purpose, the directions of the soft support by the apparatus according to the present invention are preferably those of a translational degree of freedom in the direction of the motor axis and of two rotational degrees of freedom about two axes running orthogonal to the motor axis and to each other.

The apparatus according to the present invention may further be applied for mounting a hammering or shaking device comprising a mass which is repeatedly accelerated in the direction of a main axis to a fixed or moving structure. Such appliances are also designated as shakers or hammer mechanisms. They include forging hammers and similar hammering tools. In these cases the directions of the soft support by the elastic arrangement of the apparatus according to the present invention are preferably those of a translational degree of freedom in the direction of the main axis and of two rotational degrees of freedom about the axes orthogonal to the main axis and orthogonal to each other.

The apparatus according to the present invention may also be used for mounting an object to a hammering or shaking device comprising a mass repeatedly accelerated in the direction of a main axis to, for example, mount a shock-sensitive instrument to such an appliance, like for example a sensor or also a handle bar which should not be subjected to the shocks of the mass for protecting a hand gripping the handle. Also in theses cases the directions of the soft support are preferably those of the translational degree of freedom in the direction of the main axis and of two rotational degrees of freedom about the axes orthogonal to the main axis and orthogonal to each other.

In another embodiment of the apparatus for mounting an object to a structure comprising at least two elastic partial arrangements arranged at a distance in the direction of a main axis, the elastic partial arrangements are soft in the direction of the main axis and stiff orthogonal to the main axis. The elastic partial arrangements each have an inner connection area close to the main axis and an outer connection area at a distance to the main axis. Further, each elastic partial arrangements has at least two spiral-shaped leaf springs which extend in a common leaf plane between the connection areas, and which are spirally wound into each other. These at least two, preferably also exactly two leaf springs of each elastic partial arrangement of this embodiment of the apparatus according to the present invention result in a very soft support of the object at the structure along the main axis, whereas the object is stiffly guided at the structure in all other directions. Due to their spiral shape, the leaf springs are comparatively long and may thus provide the soft support in the direction of the main axis over quite a long way.

Preferably, the width of the leaf springs of the apparatus according to the present invention does not increase with increasing distance to the axis like in case of a spiral-cut diaphragm. Instead, the width of the leaf springs is constant or even decreases with decreasing distance to the axis.

Preferably, the leaf springs—in circumferential direction about the axis, and with regard to the angular distance between their inner connection area close to the axis and their outer connection area farther away from the axis—span an angle in a typical range of 180° to 270°. This angle should not be much smaller to ensure the soft support in the direction of the main axis. It should, however, also not be much bigger as this would reduce the stiffness of the guiding in those directions orthogonal to the axis.

The leaf springs of each element may in every aspect be rotational symmetric with regard to the main axis, i.e. particularly both with regard to their construction and their distribution around the main axis.

Even in case of more than two leave springs per each elastic partial arrangement, these leaf springs are preferably arranged at a maximum distance in circumferential direction about the axis. This also means that they are preferably uniformly distributed around the axis. Thus, the formation of any predominant direction orthogonal to the main axis is avoided. In this context it should be mentioned that the apparatus according to the present invention generally displays no tendency to the formation of predominant directions, and thus—as a rule—only needs two leaf springs per each elastic partial arrangement and does not require at least three leaf springs, for example.

The leaf springs may be part of a single one-piece leaf spring unit per elastic partial arrangement. Such a leaf spring unit or even the individual leaf springs may be made of a metallic material or of a fiber compound material, for example.

The distance between the at least two elastic partial arrangements in the direction of the main axis is preferably at least twice as big as the distance between the outer connection area to the inner connection area in radial direction to the axis. The longer the distance between the two elastic partial arrangements in the direction of the main axis, the stiffer is the guiding of the object at the structure with regard to tilting movements of the object about tilting axes orthogonal to the main axes.

In one application of this embodiment of the apparatus according to the present invention, the inner connection area of each spring element has a common connection interface or connector for all leaf springs, whereas the outer connection area of each spring element has one separate connection point for each leaf spring. Due to the greater distance of the leaf springs at the outer connection area in circumferential direction about the main axis, a connection area continuously running around the main axis would be unnecessarily complex. Additionally, further parts of the apparatus according to the present invention may be provided between separate connection points for each leaf spring in the outer connection area.

This is particularly advantageous when an absorber mass of a vibration absorber is elastically coupled to the object via at least two further elastic partial arrangements arranged at a distance in the direction of the axis. This vibration absorber absorbs vibrations of the object in the direction of the main axis which are still transferred to the object from the structure or otherwise.

Preferably, the further elastic partial arrangements are equal or equivalent to the elastic partial arrangements. Thus, the eigenfrequency of the vibration absorber may be simply adjusted to the eigenfrequency of the object by means of the weight of the absorber mass so that a maximum efficiency of the vibration absorber is achieved.

A particularly compact construction results, if the leaf springs of one elastic partial arrangement for supporting the object at the structure and of one further elastic partial arrangement coupling the absorber mass to the object are spirally wound into each other, and have a common connection interface or connector to the object. This common connector particularly is the common inner connection area of the respective elastic partial arrangements. In the common outer connection area farther away from the main axis, a connection point of the one elastic partial arrangement to the structure follows to one connection point of the one further elastic partial arrangement to the absorber mass.

The leaf springs of the one elastic partial arrangement and the corresponding one further elastic partial arrangement spirally wound into each other may be parts of a single one-piece leaf spring unit resulting in a particularly simple construction of the apparatus according to the present invention comprising the vibration absorber.

Additionally, a damping may be effective between the connection areas of the elastic partial arrangements. This does not only apply to the elastic partial arrangements which support the object at the structure but also for the further elastic partial arrangements which couple the absorber mass of the vibration absorber to the object. Such a damping dissipates kinetic energy, particularly vibration and shock energy, and thus avoids high amplitudes of the relative movement of the object with regard to the structure or of the absorber mass with regard to the object.

Particularly, the damping may be provided magnetically or by means of inner damping of the leaf springs or by means of a damping material applied to at least one of the leaf springs of at least one elastic partial arrangement or further elastic partial arrangement. For example, a certain damping may be achieved in that metallic leaf springs are provided with a coating of an elastomer material. Generally, even an additional hydraulic or pneumatic shock absorber may be active between the object in the structure in the direction of the main axis.

Further, in the apparatus according to the present invention, at least one leaf spring may be actively deformable to for example actively attenuate movements of the object with regard to the structure. For this purpose, an active functional material may be applied to the leaf spring. For example, the leaf spring may be coated with a piezo-electric material including control electrodes which deforms the leaf spring upon activation by applying a voltage to the control electrodes according the so-called bi-metal principle.

Now referring in greater detail to the drawings, FIG. 1 is a perspective view onto the back side of a mirror glass 1 of an exterior rear view mirror of a motor vehicle. An apparatus 2 is provided for mounting the mirror glass 1 via a mirror holder to the body of the motor vehicle not depicted here. The apparatus 2 comprises two interfaces 3 to be fixed to the mirror holder or to points which are fixed with regard to the body of the motor vehicle. One spiral-shaped leaf spring 4 extends away from each of the two interfaces 3. Both leaf springs 4 have a same spiral axis 5 across which the two interfaces 3 are diametrically facing each other. The spiral axis 5 is orthogonal to a mirror plane 6 of the mirror glass 1, and it runs through the center of weight of the mirror glass 1. In an unloaded state of the leaf springs 4, their directions of main extension run in a common leaf plane which is orthogonal to the spiral axis 5 and thus parallel to the mirror plane 6. In the area of the spiral axis 5, i.e. close to the spiral axis 5, the mirror glass 1 is connected to both leaf springs 4 via a common interface 7 or connector in a fixed way. On that side of the leaf plane of the spiral springs 4 that is opposite to the mirror plane 1, the interface 7 provides a mass 8 for counter-balancing the weight of the mirror glass 1. The apparatus 2 guides the mirror glass 1 stiffly with regard to the translational degrees of freedom in all directions parallel to the mirror plane 6 and with regard to the rotational degree of freedom about the spiral axis 5. In the directions of the remaining three degrees of freedom, i.e. of the translational degree of freedom in the direction of the spiral axis 5 and the two rotational degrees of freedom about two axes orthogonal to the spiral axis 5 and orthogonal to each other, however, the apparatus 2 soft elastically supports the mirror glass 1. The main modes of motion in the directions of all these degrees of freedom are decoupled; i.e. a displacement in the direction of one degree of freedom does not automatically result in a displacement of the mirror glass 1 in the direction of another degree of freedom. The stiff support in selected directions cares for that the mirror glass 1 directly follows any movements of the body of the motor vehicle in these directions and that the mirror glass 1 is stiffly supported with regard to any external loads and forces. The soft support in the other directions results in a vibration isolation of the mirror glass 1 from the body of the motor vehicle at all frequencies above the low eigenfrequencies of this soft support.

Figure 2:
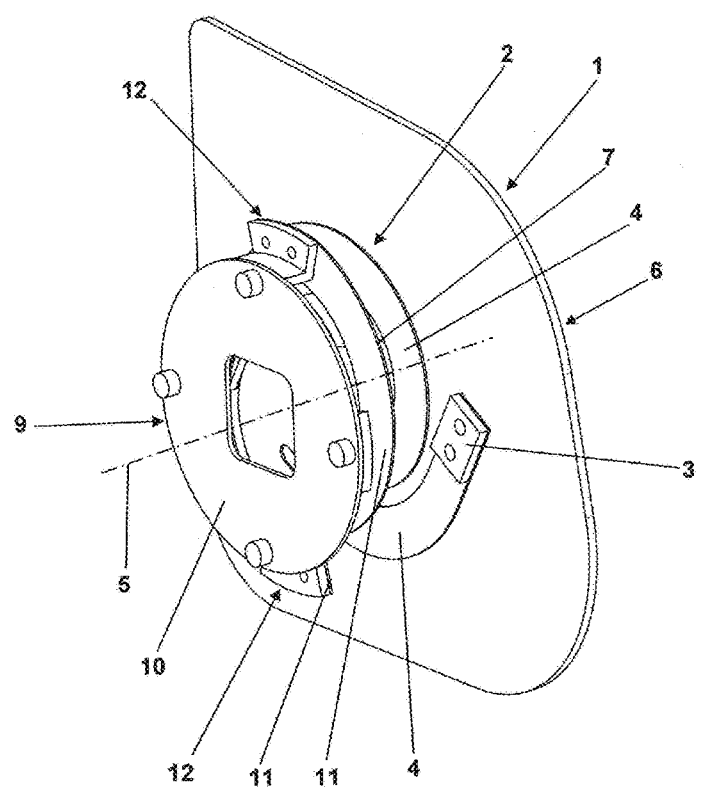
FIG. 2 is a rear view of a mirror glass of an exterior rear view mirror for a motor vehicle having a same viewing direction as FIG. 1 and showing an embodiment of the apparatus for mounting the mirror glass to the body of the motor vehicle, which comprises a vibration absorber.
Figure 3:
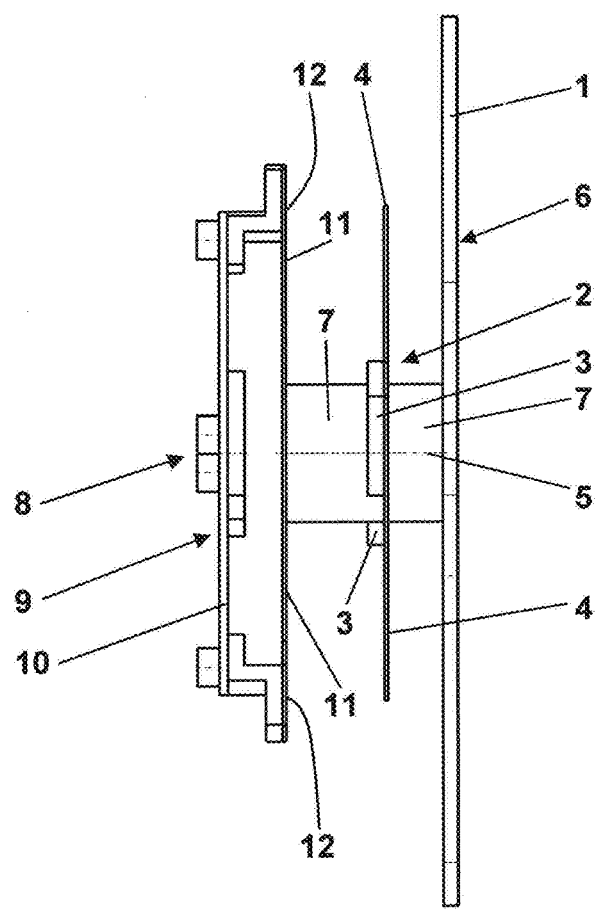
FIG. 3 shows the mirror glass and the apparatus according to FIG. 2 in a side view.

To also avoid undesired vibrations of the mirror glass 1 at these low eigenfrequencies, the apparatus 2 comprises an attenuation device for the main modes of motion of the mirror glass 1 in the directions of the soft support which is not depicted in FIG. 1. This attenuation device may include a vibration absorber 9 as depicted in FIGS. 2 and 3, which—at that side of the leaf plane of the spiral springs 4 opposing the mirror glass 1—is connected to the interface 7 and thus also acts as an additional counter-balancing mass 8 for the weight of the mirror glass 1. An absorber mass 10 of the vibration absorber 9 is coupled to the interface 7 via a further elastic arrangement which is equivalent to the elastic arrangement of the leaf springs 4 in that it also consists of spiral-shaped leaf springs 11 with a common center on the spiral axis 5. A leaf plane of the spiral springs 11 is parallel to the leaf plane of the spiral springs 4; and the spiral springs 11 are to the interface 7 at their common center in the area of the spiral axis 5 and to the absorber mass 10 at connection points 12 facing each other across the spiral axis 5. The vibration absorber 9 comprises three absorber main modes with absorber eigenfrequencies which are adjusted to the three main modes of motion and the associated eigenfrequencies of the mirror glass 1 in the directions of the soft support by the apparatus 2. The vibration absorber 9 thus keeps the mirror glass 1 at rest with regard to these main modes of motion of the soft support.

Figure 4:
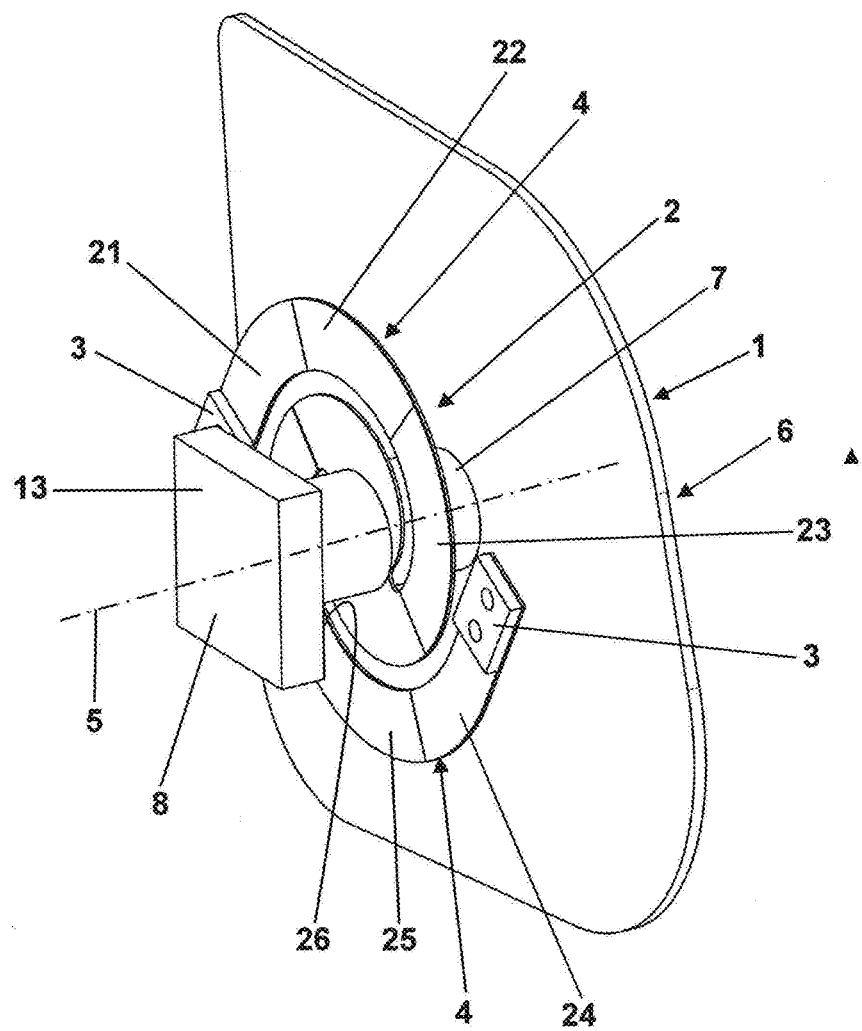
FIG. 4 is a perspective rear view of a mirror glass of an exterior rear view mirror for a motor vehicle with an embodiment of the apparatus for mounting the mirror glass to a body of the motor vehicle, in which activatable functional materials are integrated in an elastic arrangement of the apparatus.

The embodiment of the apparatus 2 for mounting the mirror glass 1 in a vibration-free manner according to FIG. 4 also bases on that one according to FIG. 1. Here, the counter-balancing mass 8 includes a further body 13 rigidly connected to the interface 7. The attenuation device consists of functional material in form of so-called piezo patches 21 to 26 integrated in the elastic arrangement of the leaf springs 4. The piezo patches 21 to 26 are laminated to the spiral-shaped leaf springs 4 and comprise a piezo-electric layer between two control electrodes. This layer expands in parallel to the surface of the leaf springs 4 upon application of an external voltage to the control electrodes. As a result, the leaf springs 4 are deformed according to the principles of a bi-metal. Thus, movements of the mirror glass 1 may be initiated and existing vibrations of the mirror glass 1 may be actively extinguished. The individual piezo patches 21 to 26 may be selectively controlled for extinguishing vibrations in the directions of the soft support by the apparatus 2. Particularly, for a movement about the vertical axis orthogonal to the spiral axis 5, only the piezo patches 22 and 25 are to be activated in opposite directions. For a movement about the cross axis orthogonal to the spiral axis 5, only the piezo patches 23 and 26 are to be activated in opposite directions; and for a movement in the direction of the spiral axis 5, the piezo patches 21 and 24 are to be operated in opposite directions. As for each of these movements another pair of piezo patches 21 to 26 is to be selectively activated, vibrations in the directions of these movements may be actively attenuated independently from each other by operating the respective piezo patches in antiphase with the existing movements of the mirror glass 1.

Figure 5:
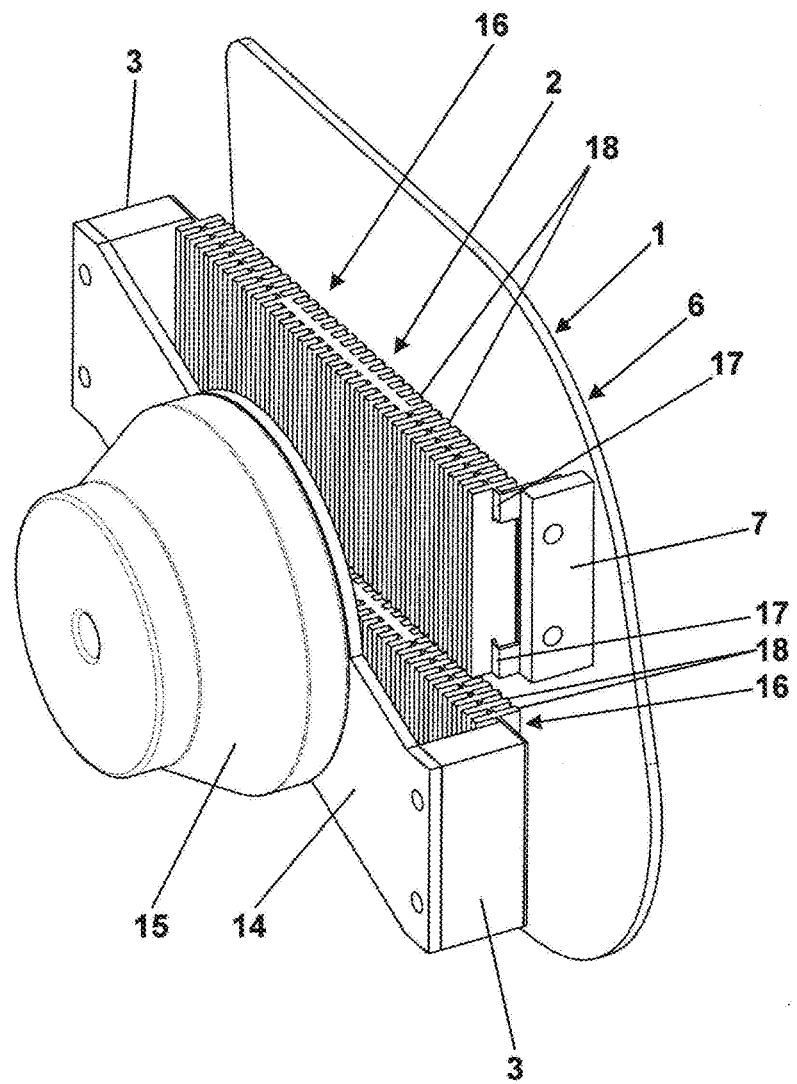
FIG. 5 is a perspective rear view of a mirror glass of an exterior rear view mirror for a motor vehicle showing essential parts of an embodiment of the apparatus for mounting the mirror glass to the body of the motor vehicle. This embodiment—instead of spiral-shaped leaf-springs which are provided in the embodiments of FIG. 1 to 4—includes pairs of bending beams stiffened by stringers. Additionally, FIG. 5 indicates an positioning device for the mirror glass.

FIG. 5 shows another embodiment of the apparatus 2 for mounting the mirror glass 1 to the body of a motor vehicle which comprises the same directions of hard or stiff and soft support as the embodiments of the apparatus 2 according to FIG. 1 to 4. The interfaces 3 are here provided in two opposing boundary areas of the mirror glass 1 and are supported at a mirror holder 14. The mirror holder 14 is configured to be mounted to the body of the motor vehicle via a positioning device 15 for positioning the mirror glass 1 with regard to the body of the motor vehicle. Such a positioning device is generally known and typically includes one or more electric servo motors. Double springs 16 extend from the interfaces 3 towards the interfaces 7 which are arranged in opposing boundary areas of the mirror glass 1. The construction of each double spring 16 is based on two bending beams 17 which are parallel to each other and which are stiffened in that they are supported at each other by stringers 18.

Figure 6:
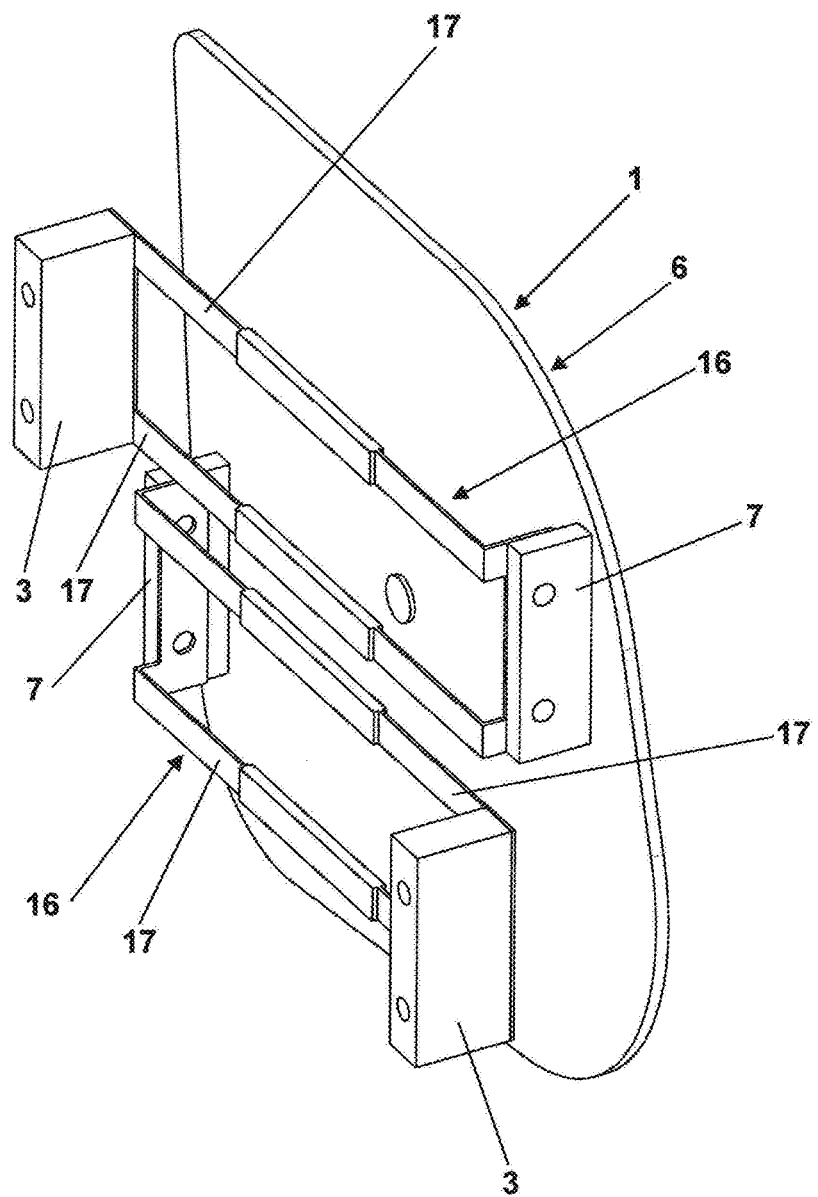
FIG. 6 shows the mirror glass with the bending beams according to FIG. 5 but without the stringers.

In FIG. 6 the bending beams 17 are depicted without the stringers 18. The bending beams 17 and the stringers 18 may completely consist of steel or plastic. Alternatively, the bending beams 17 may consist of springs steel to which the stringers 18 are injection-molded of plastic. The stringers 18 stiffen the spring elements 16 in those directions of the desired stiff support of the mirror glass 1 at the mirror holder 14 shown in FIG. 5. The spring elements 16, however, remain soft for those directions of the desired soft support.

Figure 7:
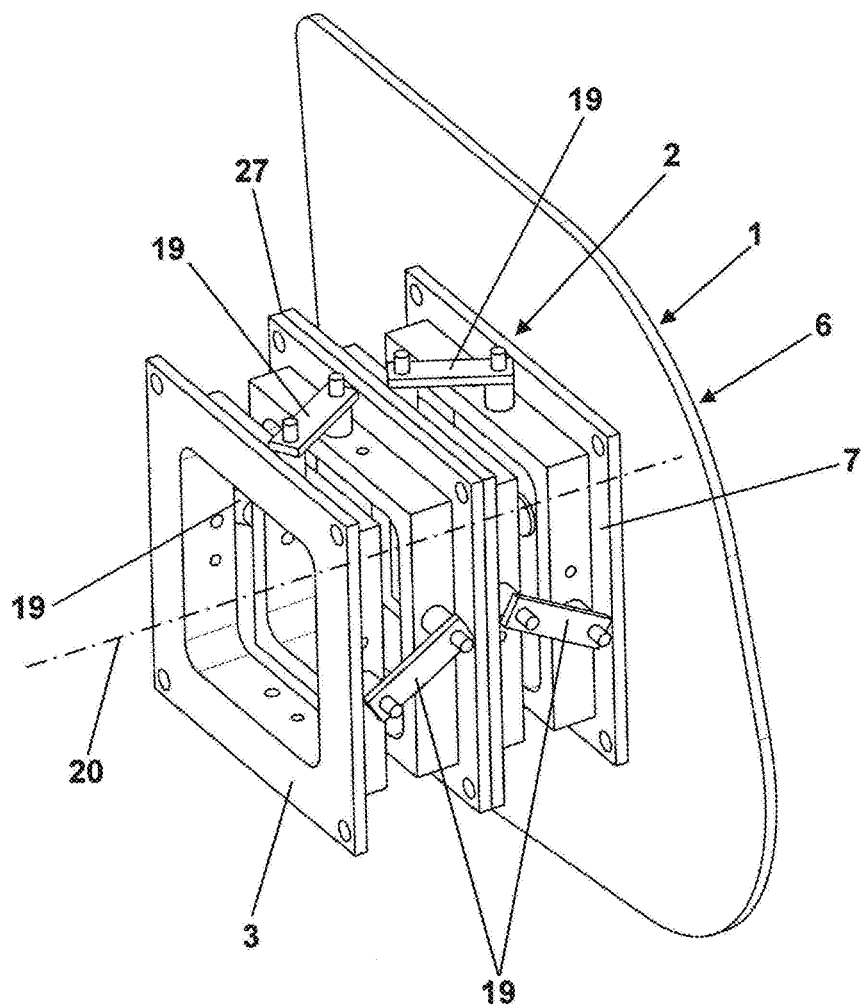
FIG. 7 is a perspective rear view of a mirror glass of an exterior rear view mirror for a motor vehicle showing essential parts of an embodiment of the apparatus for mounting the mirror glass to the body of the motor vehicle. This embodiment includes a pair of quadruple helices of opposite pitch connected in series.

The embodiment of the apparatus 2 for mounting the mirror glass 1 to the body of a motor vehicle in a vibration-free manner according to FIG. 7 is based on a pair of quadruple helices of opposing pitches connected in series. Here, these quadruple helices are each condensed to four leaf spring sections 19 which are arranged in a rotation-symmetric arrangement around a helix axis 20 and which are each swivel-mounted to one of the interfaces 3 and 7 and to an intermediate element 21 about axes orthogonal to the helix axis 20. The pitch of the leaf spring sections 19 extending from the interface 3 to the intermediate element 21 is opposite to the pitch of the leaf spring sections 19 extending between the intermediate element 21 and the interface 7. As a result, a linear movement of the mirror glass 1 in the direction of the helix axis 20 results in a rotation of the intermediate element 27 about the helix axis 20 but does not initiate a rotational movement of the mirror glass 1 about the helix axis 20. Thus, the directions of the soft and the hard support of the mirror glass 1 at the body of the motor vehicle are the same as in case of the previous embodiments of the apparatus 2; and the apparatus 2 according to FIG. 7 decouples the main modes of motion of the mirror glass 1 relative to the body of the motor vehicle.

Figure 8:
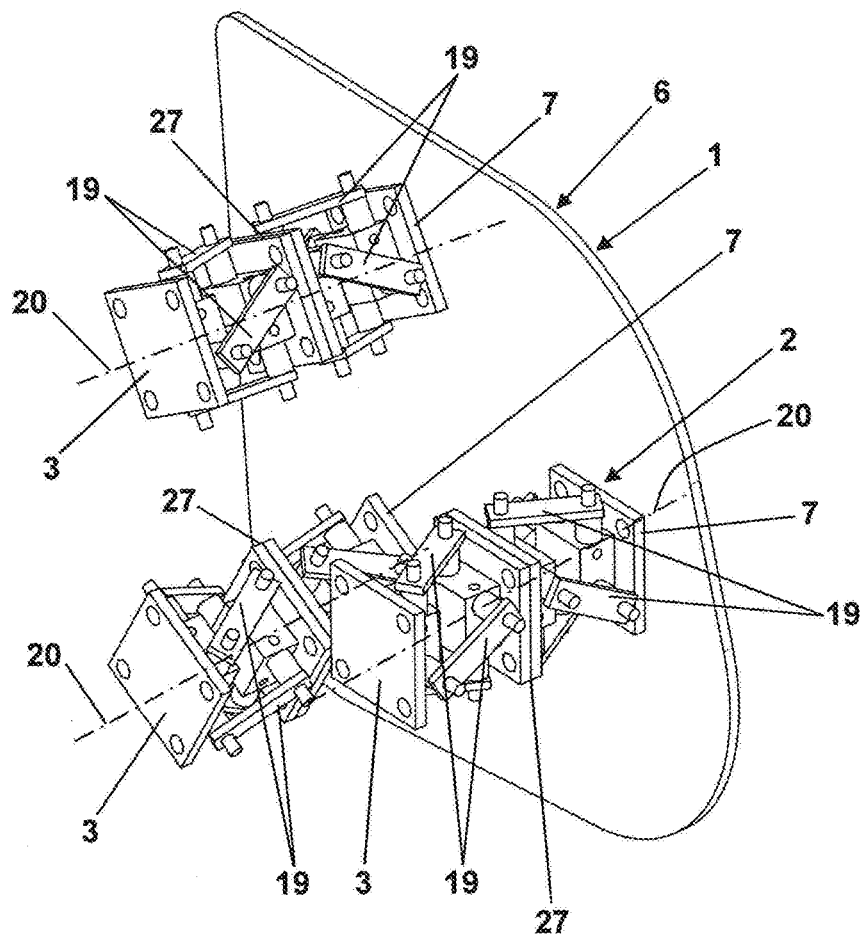
FIG. 8 is a perspective rear view of a mirror glass of an exterior rear view mirror for a motor vehicle showing essential parts of an embodiment of the apparatus for mounting the mirror glass to the body of the motor vehicle. This embodiment includes three parallel connected pairs of quadruple helices of opposite pitch connected in series.

FIG. 8 illustrates a variant of the apparatus 2 according to FIG. 7 in which in total three pairs of two quadruple helices with leaf spring sections 19 of opposite pitch connected in series are provided and distributed over the back side of the mirror glass 1. The helix axes 20 of the pairs of multiple helices of opposing pitch are parallel to each other and orthogonal to the mirror plane 6 of the mirror glass 1. Due to the plurality of the pairs of multiple helices of opposing pitch, the stiffness of the support of the mirror glass 1 with regard to movements parallel to the mirror plane 6 is increased. Such a parallel connection of a plurality of elastic partial arrangements which could also individually be used as elastic arrangements of the apparatus 2 is a particular advantage, if an object to be mounted has big dimensions and/or a high weight. Preferably, the elastic partial arrangements are symmetrically arranged with regard to a main axis which coincides with a translational degree of freedom in whose direction the apparatus 2 provides soft support.

Figure 9:
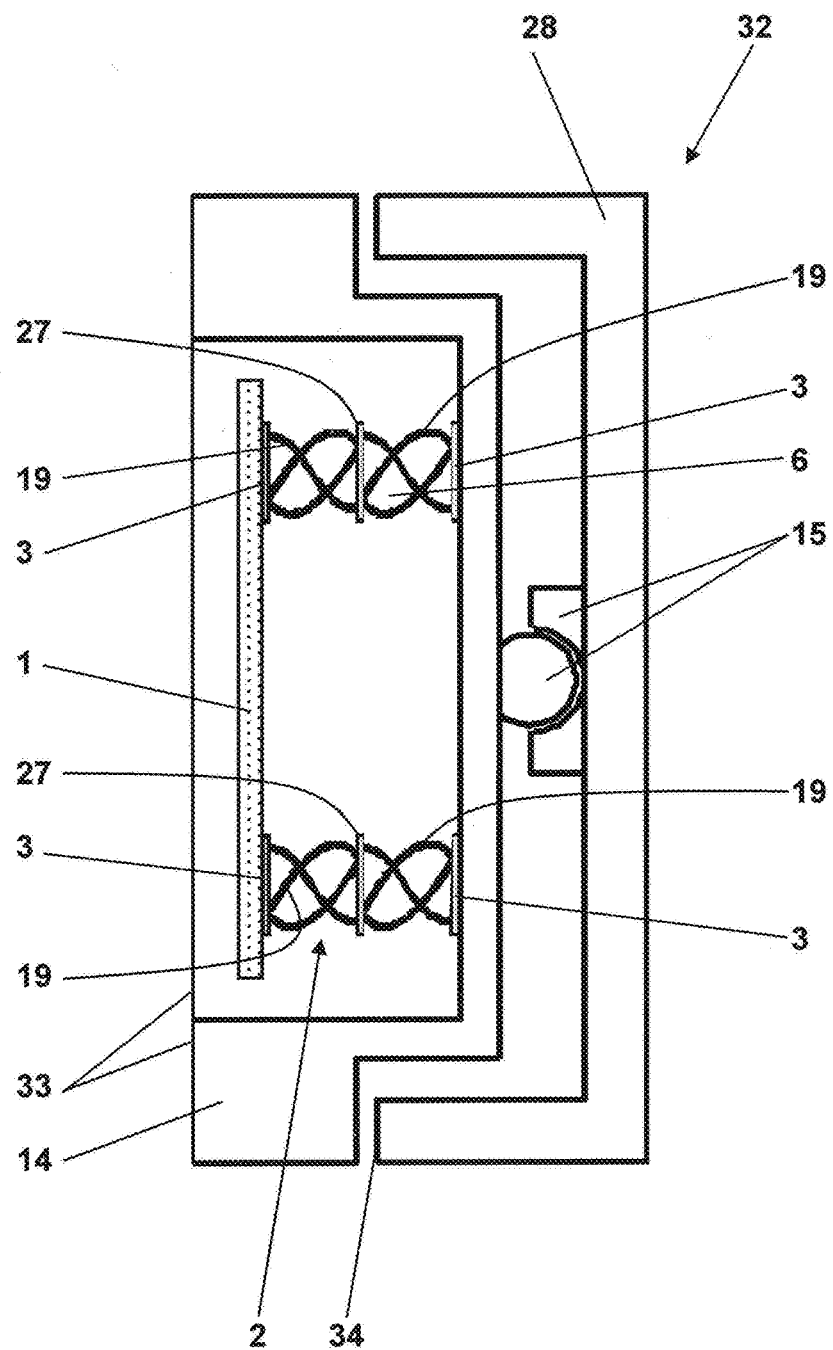
FIG. 9 is a longitudinal section through a rear view mirror for a motor vehicle including an embodiment of the apparatus for mounting its mirror glass to the body of the motor vehicle. This embodiment being based on parallel connected pairs of triple helices of opposite pitch connected in series.

The exterior rear view mirror 32 of a motor vehicle depicted in FIG. 9 in a longitudinal section comprises a mirror housing 28 to which the mirror holder 14 is mounted via the positioning device 15, i.e. adjustable about two axes. The mirror housing 28 partially encloses the mirror holder 14 which itself is designed as an open housing. The mirror glass 1 is inwardly offset into the mirror holder 14 with regard to a rim 33 of the mirror holder 14. However, it is still positioned in front of a rim 34 of the mirror housing 28 here. Nevertheless, the mirror glass 1 is protected by the mirror housing 28 against direct aerodynamic loads, i.e. against an excitation by wind which, in FIG. 9, goes from left to right. The mirror holder 14 with its protruding rim 33 additionally protects the mirror glass 1 against vortices generated at this rim 33. Aerodynamic pressure fluctuations may nevertheless cause an excitation of the mirror holder 14 for vibrations. These vibrations, however, are not transferred to the mirror glass 1 as the mirror glass 1 is mounted via the apparatus 2 to the mirror holder 14 in an optimally decoupled and attenuated way with regard to such root point excitations. According to FIG. 9, the apparatus 2 is based on pairs of triple helices of leaf springs 19 of opposing pitch with intermediate elements 27.

Figure 10:
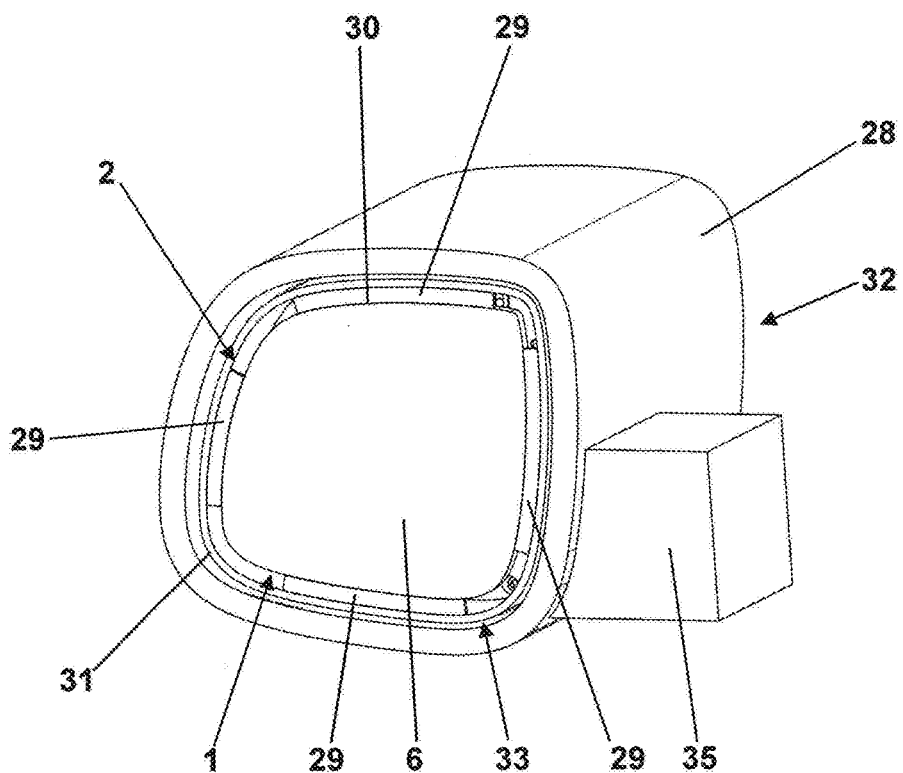
FIG. 10 is a perspective view of an exterior rear view mirror for a motor vehicle with viewing direction onto the mirror glass. The apparatus for mounting the mirror glass to the body here comprises elastomeric springs distributed over the circumference of the mirror glass.
Figure 11:
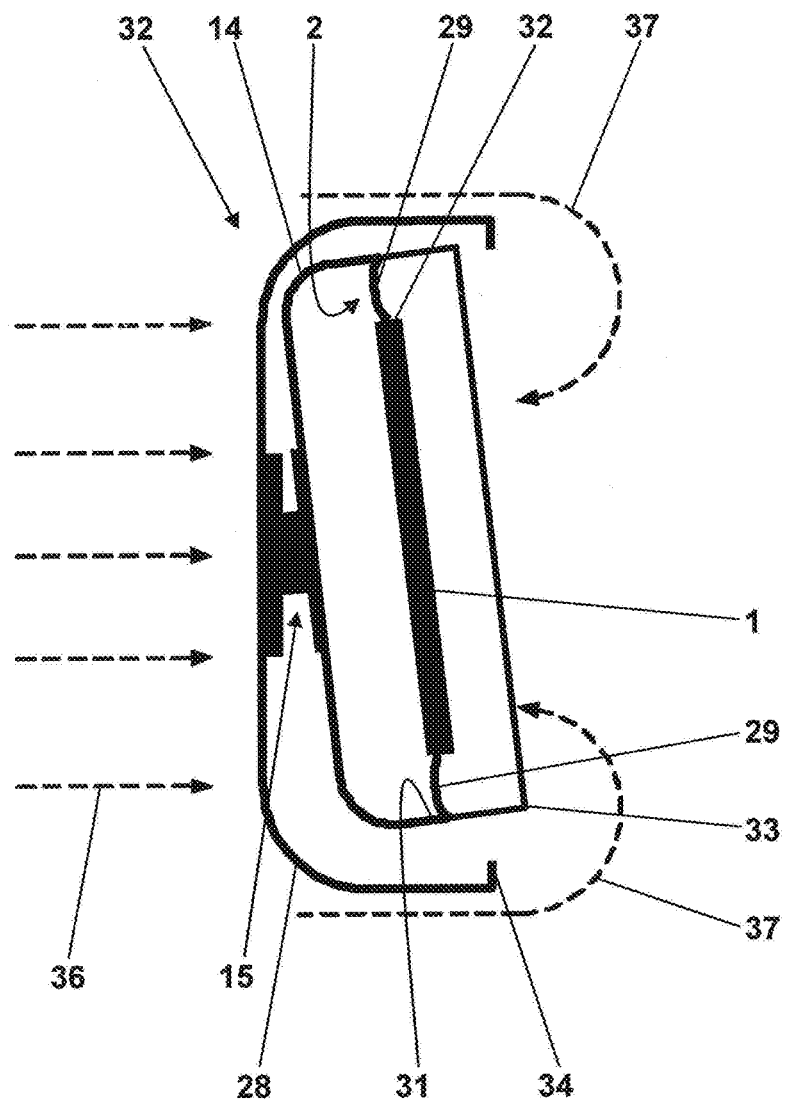
FIG. 11 is a longitudinal section through the exterior rear view mirror according to FIG. 10.

FIGS. 10 and 11 show an entire exterior rear view mirror 32 in which the direction-selective hard and stiff support of the mirror glass 1 at the mirror holder 14 is provided by means of elastomeric springs 29. The elastomeric springs 29 are arranged between a rigid outer circumference 30 of the mirror glass 1 and a rigid inner circumference 31 of the mirror holder 14 and essentially extend within or close to the mirror plane 6. Due to a low tensile stiffness of the elastomeric springs 29 which may be supplemented by some pressure prestress onto the elastomeric springs 29 between the circumferences 30 and 31, the same directions of hard of stiff and soft support are realizes as in case of the previously describes embodiments of the apparatus 2 for mounting the mirror glass 1 of an exterior rear view mirror to the body of a motor vehicle in a vibration-free manner. The mirror housing 28 is connected to the respective body of the motor vehicle via a base 35. The base 35 may include a folding hinge for folding in the exterior rear view mirror 32 towards the body. In FIG. 11 a wind excitation 36 of the exterior rear view mirror 32 and vortices 37 which are generated at the rims 33 and 34 of the mirror holder 14 and the mirror housing 28 are indicated. The mirror glass 1 is here offset into the exterior rear view mirror 32 to such an extent that it is also set back with regard to the rim 34 of the mirror housing 28 and thus protected against any direct influence of the vortices 37.

In the embodiments of FIG. 5 to 11 the attenuation device of the apparatus 2 which keeps the mirror glass 1 at rest even at the eigenfrequencies of its soft support is not depicted but may nevertheless be provided.

Figure 12:
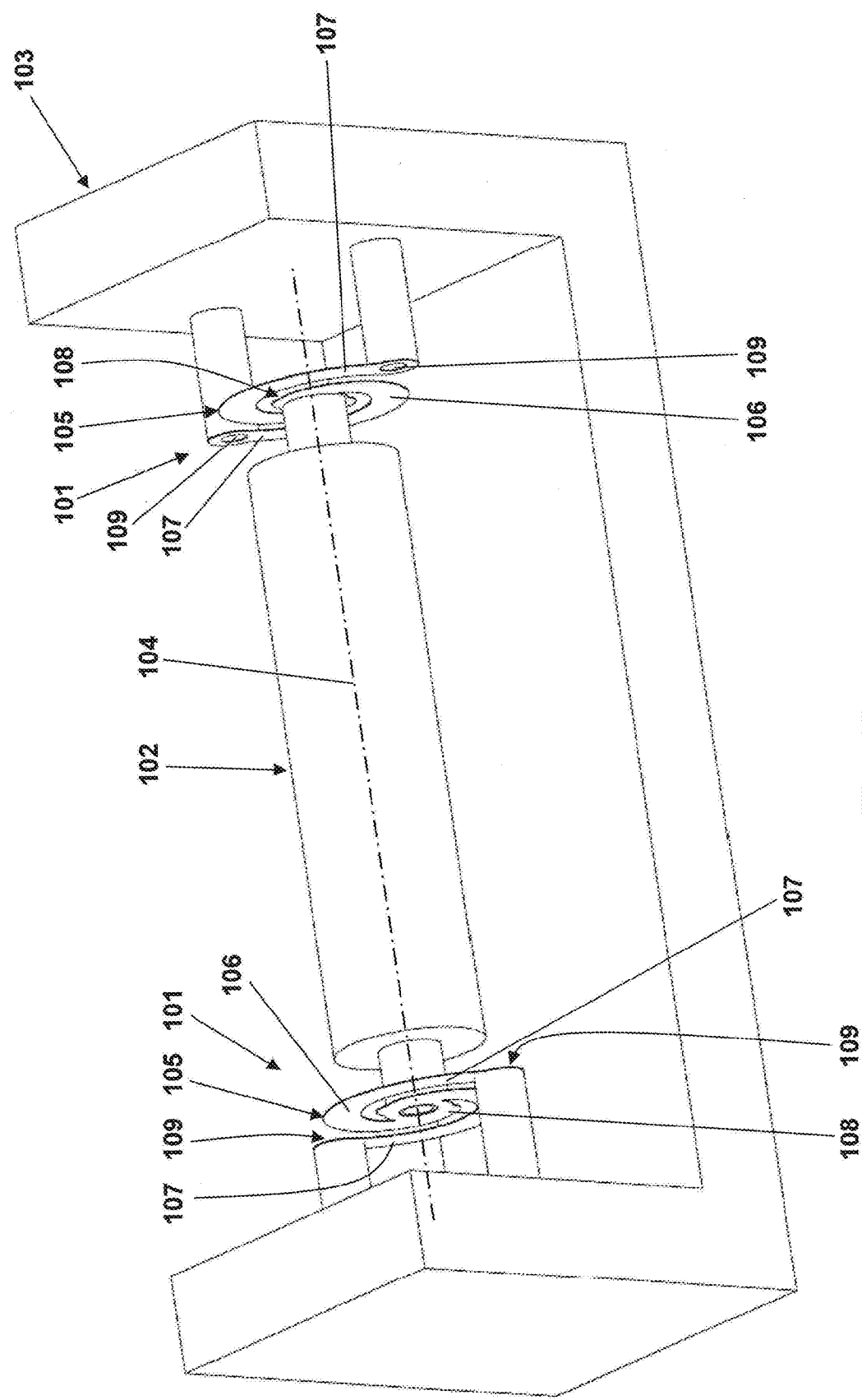
FIG. 12 is a perspective view of another embodiment of the apparatus for mounting an object to a structure.

The apparatus 101 depicted in FIG. 12 serves for mounting an object 102 to a structure 103. The support of the object 102 at the structure 103 is soft in the direction of a main axis 104 and stiff in all other directions. Thus, the object 102 is linearly guided at the structure 103 in the direction of the axis 104. This means that both linear or translational movements of the object 102 relative to the structure 103 in all directions orthogonal to the main axis 104 and rotations of the object 102 relative to the structure 103 about the axis 104 and any tilting axes orthogonal to the main axis 104 are prevented at a high stiffness. Linear movements of the object 102 in the direction of the main axis 104, however, are possible with low forces which only increase with high displacements of the object 102 relative to the structure 103 in the direction of the main axis 104. This distribution of the stiffnesses ensures a decoupling of the object 102 with regard to vibrations and shocks of the structure 103 in the direction of the main axis 104. The appropriate stiffnesses are provided by two elastic partial arrangements 105. Each elastic partial arrangements 105 comprises a leaf spring unit 106 of a plane basic form in which it is depicted in FIG. 12. Each leaf spring unit 106 comprises two leaf springs 107 which are spirally wound into each other about the main axis 104 and which extend from a common inner connection area 108 to separate connection points 109 in an outer connection area. The inner connection area 108 is rigidly connected to the object 102, whereas the connections points 109 are rigidly connected to the structure 103. Each leaf spring 107 spans an angle of more than 180° in the circumferential direction about the main axis 104, and it comprises an essentially constant width in the leaf plane of the respective leaf spring unit 106. The arrangement of the two leaf springs 107 of each leaf spring unit 106 is 180° rotation symmetric with regard to the main axis 104. All leaf springs 107 of both elastic partial arrangements 105 have a same pitch or spiral direction about the main axis 104. The distance of the two elastic partial arrangement 105 along the axis 104 is more than twice as high than the distance of the connection points 109 to the connection area 108 in radial direction to the main axis 104.

Figure 13:
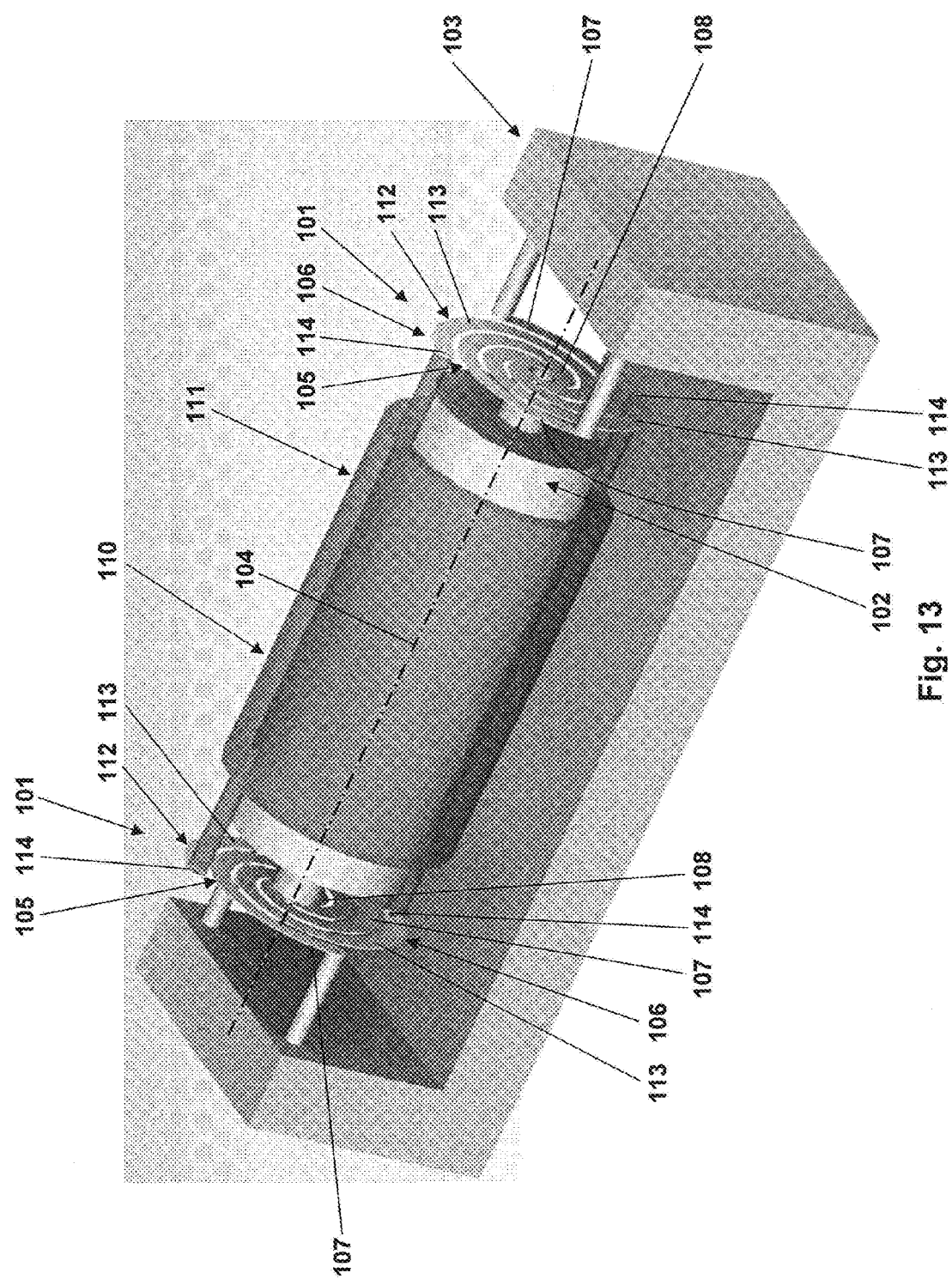
FIG. 13 is a perspective view of even another embodiment of the apparatus for mounting an object to a structure. This embodiment, n addition to the embodiment of FIG. 12, is provided with a vibration absorber.

FIG. 13 shows an embodiment of the apparatus 101 which, compared to FIG. 12, is supplemented with a vibration absorber 110. The vibration absorber 110 comprises an absorber mass 111 which is tube-shaped and coaxially arranged around the object 102. The absorber mass 111 is elastically coupled to the object 102 by means of two further elastic partial arrangements 112. This support is also soft in the direction of the main axis 104 but stiff otherwise. This is achieved in that the further elastic partial arrangements 112 each comprise leaf springs 113 which are equal to the leaf springs 107 of the elastic partial arrangements 105. Particularly, the leaf springs 113 are also parts of the leaf spring units 106 and spirally extend from the common connection area 108 close to the main axis 104 towards outer connection points 114, where they are rigidly connected to the absorber mass 111. In each leaf spring unit 106, one leaf spring 113 follows to each leaf spring 107 and vice versa in circumferential direction around the main axis 104. All pairs of leaf springs 107 and 113 succeeding in circumferential direction around the main axis 104 display same angular distances between the leaf springs 107 and 113. The vibration absorber 110 absorbs vibrations of the object 102 in the direction of the main axis 104, i.e. these vibrations are absorbed by the absorber mass 111 so that the absorber mass 111 exerts antiphased forces onto the object 102, and thus keeps the object 102 at rest. Additionally, a damping for the movement of the absorber mass 111 and/or the object 102 in the direction of the main axis 104 may be provided (not depicted here). Further, activatable functional materials may be applied to the leaf springs 107 and/or the leaf springs 113 to actively deform these leaf springs by activating the functional materials. In this way, forces between the structure 103 and the object 102 or the object 102 and the absorber mass 111 may purposefully be generated to influence their relative movements.

Many variations and modifications may be made to the preferred embodiments of the invention without departing substantially from the spirit and principles of the invention. All such modifications and variations are intended to be included herein within the scope of the present invention, as defined by the following claims.

We claim:

1. An apparatus for mounting an object to a structure in a vibration-free manner, the apparatus comprising:
    an elastic arrangement comprising at last two leaf springs which are spirally wound into each other about a spiral axis within a common leaf plane and which are connected to both the structure and the object in connection areas which are facing each other across a center of mass of the object, the at last two leaf springs
        stiffly support the object at the structure in directions of two translational degrees of freedom parallel to the leaf plane and one rotational degree of freedom about the spiral axis and
        soft elastically support the object at the structure in directions of one translational degree of freedom in direction of the spiral axis and two rotational degrees of freedom about two axes orthogonal to the spiral axis and orthogonal to each other,
    wherein the object, in each of the directions of the two translational degrees of freedom parallel to the leaf plane and the one rotational degree of freedom about the spiral axis, comprises an eigenfrequency which is by a factor of at least ten higher than any eigenfrequency of the object in each of the directions of the one translational degree of freedom in direction of the spiral axis and
        the two rotational degrees of freedom about two axes orthogonal to the spiral axis and orthogonal to each other, and
    wherein the elastic arrangement is undamped in each of the directions of the one translational degree of freedom in direction of the spiral axis and the two rotational degrees of freedom about two axes orthogonal to the spiral axis and orthogonal to each other; and
    an attenuation device for any motion of the object in the directions of the one translational degree of freedom in direction of the spiral axis and the two rotational degrees of freedom about two axes orthogonal to the spiral axis and orthogonal to each other.

2. The apparatus of claim 1, wherein the attenuation device comprises a passive vibration absorber having absorber eigenfrequencies adjusted to the eigenfrequencies of the object in the directions of the one translational degree of freedom in direction of the spiral axis and the two rotational degrees of freedom about two axes orthogonal to the spiral axis and orthogonal to each other.

3. The apparatus of claim 2, wherein the vibration absorber is damped.

4. The apparatus of claim 3, wherein an attenuation factor of the damped vibration absorber according to Lehr is less than 0.5.

5. The apparatus of claim 2, wherein the absorber eigenfrequencies of the vibration absorber are by 5% to 25% smaller than the corresponding eigenfrequencies of the object in the directions of the one translational degree of freedom in direction of the spiral axis and the two rotational degrees of freedom about two axes orthogonal to the spiral axis and orthogonal to each other.

6. The apparatus of claim 2, wherein the vibration absorber comprises an absorber mass which is coupled to the object via a further elastic arrangement, the further elastic arrangement being equivalent to the elastic arrangement.

7. The apparatus of claim 2, wherein the vibration absorber comprises an absorber mass which at least partially counterbalances the object with regard to its connection to the elastic arrangement.

8. The apparatus of claim 1, wherein the attenuation device comprises actuators made of activatable functional material which is applied to the attenuation device.

9. The apparatus of claim 8, wherein the actuators made of activatable functional material are arranged and configured such that their activation generates at least one of movements and forces between the object and the structure in at least one of the directions of the one translational degree of freedom in direction of the spiral axis and the two rotational degrees of freedom about two axes orthogonal to the spiral axis and orthogonal to each other.

10. The apparatus of claim 9, wherein the attenuation device activates the actuators made of activatable functional material in the sense of an active attenuation of the object in the at least one of the directions of the one translational degree of freedom in direction of the spiral axis and the two rotational degrees of freedom about two axes orthogonal to the spiral axis and orthogonal to each other.

11. The apparatus of claim 1, wherein motions of the objects in the directions of the one translational degree of freedom in direction of the spiral axis and of the two rotational degrees of freedom about two axes orthogonal to the spiral axis and orthogonal to each other are decoupled from each other.

12. The apparatus of claim 1, wherein the object in each of the directions of the one translational degree of freedom in direction of the spiral axis and the two rotational degrees of freedom about two axes orthogonal to the spiral axis and orthogonal to each other has an eigenfrequency of not more than about 10 Hz, and wherein the object in each of the directions of the two translational degrees of freedom parallel to the leaf plane and the one rotational degree of freedom about the spiral axis has an eigenfrequency of not less than about 100 Hz.

13. The apparatus of claim 1, wherein the object is a mirror glass of an exterior rear view mirror of a motor vehicle, wherein the structure is a mirror holder, and wherein the directions of the one translational degree of freedom in direction of the spiral axis and the two rotational degrees of freedom about two axes orthogonal to the spiral axis and orthogonal to each other are those of a translational degree of freedom parallel to a longitudinal axis of the motor vehicle and of two rotations degrees of freedom about a vehicle cross axis and a vehicle vertical axis.

* * * * *